May 25, 1926.
H. E. BELLOMY
BROOMCORN KNIFE
Filed March 28, 1925
1,586,396
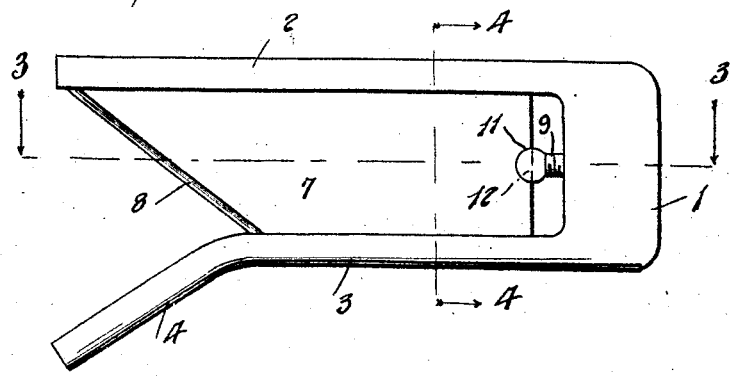
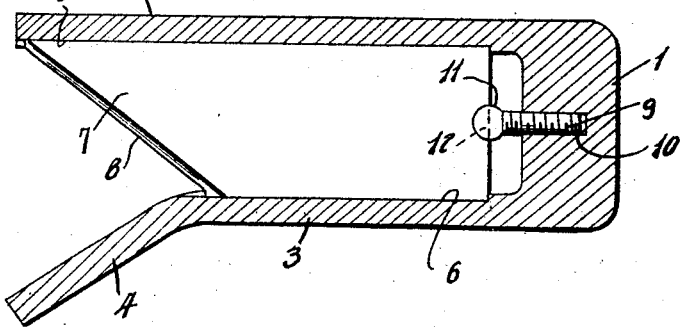
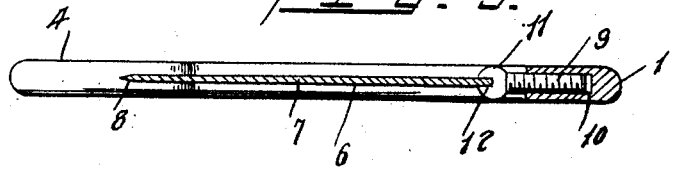
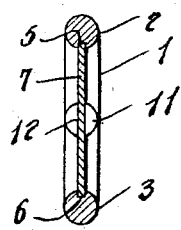
Inventor
H. E. Bellomy
By
Attorney Patented May 25, 1926.

1,586,396

UNITED STATES PATENT OFFICE.

HOMER E. BELLOMY, OF BOISE CITY, OKLAHOMA.

BROOMCORN KNIFE.

Application filed March 28, 1925. Serial No. 19,081.

The invention relates to devices for harvesting broom corn and has for its object the provision of an improved knife or cutter for the purpose stated.

The construction and operation and advantages of the invention will be described hereinafter and the device will be found illustrated in the accompanying drawings in which Figure 1 is a top plan view of the improved cutter, Figure 2 a longitudinal sectional view, Figure 3 a sectional view on a plane indicated by the line 3—3 of Figure 1, and Figure 4 a transverse sectional view on a plane indicated by the line 4—4 of Figure 1.

In the drawings similar reference characters will be used to designate corresponding parts throughout the several views.

The improved corn knife comprises a U-shaped frame having a bight portion considerably heavier than the legs as shown, the bight portion being indicated at 1 and the legs at 2 and 3. The legs 2 and 3 are preferably circular in cross section and leg 3 has its outer end 4 formed divergent from the frame as clearly shown in Figures 1 and 2.

Leg 2 is provided with a longitudinal groove 5 and leg 3 with a longitudinal groove 6, said grooves being provided to receive the side edges of a knife blade 7 that has its outer edge inclined as shown at 8.

9 indicates a screw mounted in threaded opening 10 in the bight portion 1 and having a spherical head 11 provided with a groove 12 in which is seated the rear edge of the knife blade 7.

The legs 2 and 3 are slightly resilient to permit them to be sprung apart for removal and replacement of the blade 7, it being preferable to remove the blade for sharpening, and the screw 9 is adapted to be adjusted to counteract the wear on blade 7 in sharpening.

In using the device it is held in the right hand and pushed against the stalk, rather than pulling on it as with the ordinary knife used in harvesting broom corn, and if the corn is not out of the boot, the operator can cut the corn and boot it at the same stroke thus saving time otherwise employed in cutting the stalk and booting it. It will be understood that the divergent portion 4 serves as a guide to insure engagement of the knife with the stalk, and at the same time protects the hand from engagement with the corn stalk.

What is claimed is:—

1. A broom corn knife, comprising a U-shaped frame, the side members of the frame having longitudinal grooves, one of the side members of the frame having its outer portion formed divergent, and a knife blade mounted in the grooves in said frame and having its cutting edge inclined oppositely to the divergent portion aforesaid.

2. A broom corn knife comprising a U-shaped frame of resilient material, the side members of the frame having longitudinal grooves, one of the side members of said frame having its outer portion formed divergent, an adjusting screw in the bight of said frame having a transverse groove in its head, and a knife blade mounted in the grooves in said frame and engaging the groove in the screw head and having its cutting edge inclined oppositely to the divergent portion aforesaid.

In testimony whereof I affix my signature.

HOMER E. BELLOMY.